Figure 1:
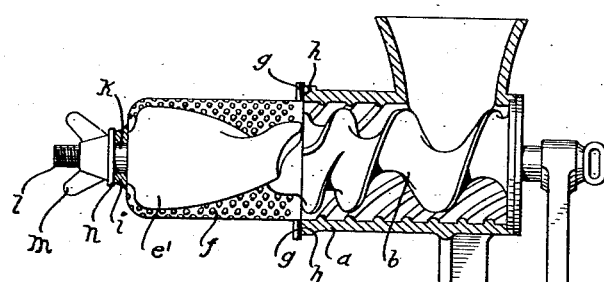

Jan. 3, 1939. G. SATZINGER 2,142,480
FOOD COMMINUTING MACHINE
Filed April 17, 1937 2 Sheets-Sheet 1

INVENTOR
GEBHARD SATZINGER
BY
ATTORNEY

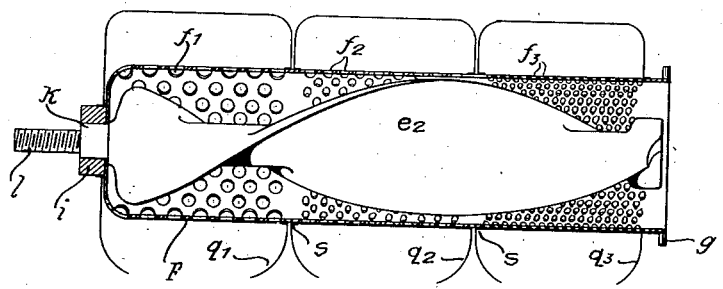
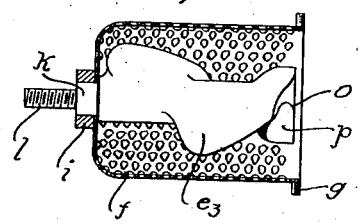
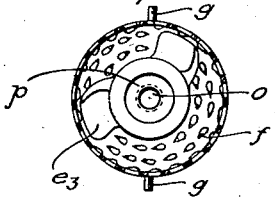
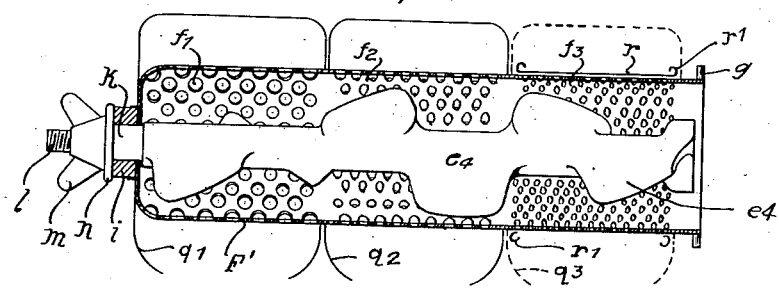

Patented Jan. 3, 1939

2,142,480

UNITED STATES PATENT OFFICE 2,142,480

FOOD COMMINUTING MACHINE

Gebhard Satzinger, Bad Kissingen, Germany

Application April 17, 1937, Serial No. 137,391
In Germany April 17, 1936

2 Claims. (Cl. 146—177)

My invention relates to machines for chopping up or comminuting food-stuffs, such as meat, raw vegetables, etc., and comprising in general a tubular casing provided with a helical cutter which while being rotated cuts up and comminutes the food-stuffs fed into the casing and at the same time moves the comminuted food-stuffs along in the casing to be discharged through a perforated disk detachably secured to the open end of the casing.

In cases where it is desirable to subsequently grate the comminuted food-stuffs, the perforated disk referred to is detached from the open end of the casing, and in its place a grating device is detachably secured to the casing, while with the said helical cutter is coupled a driving member adapted to cooperate with the inner grating surface of said grating device. Such grating devices, however, can be used only on machines provided with an overlapping collar nut by means of which the grating attachment and the driving member cooperating therewith are held together with the helical cutter.

The object of the present invention is to so design the grating device and the driving member cooperating therewith that they can be readily attached in place on any of the well-known food-stuff comminuting machines and where the driving member is given such a shape as to considerably increase the grating efficiency.

A further object of this invention is to provide a grating device enabling the foodstuff to be grated at will either coarse, medium or fine.

According to the invention, the driving member is coupled with the helical cutter of the food-comminuting machine by being directly screwed onto a threaded stem projecting from the helical cutter, there being provided in the driving member in front of its threaded bore a corresponding recess to cover the square provided at the end of the helical cutter for the reception of the perforated disk when the machine is merely used as a comminuting machine. At its outer end, the driving member is provided with a threaded stem projecting from the grating device and adapted to receive the wing nut, which otherwise holds the perforated disk in place on the helical cutter. When the grating attachment is in position, it snugly abuts the end of the tubular casing, its rotation relative thereto being prevented by small lugs engaging corresponding cavities in the tubular casing.

The driving member is provided with two or more helically formed wing portions in offset or staggered relation to each other and so disposed, that in rotating relative to the inner grating surface of the grating attachment, the said wing portions keep the grating surface free of all residue. Where the one wing portion ends, the other commences so that a continuous very efficient grating action is obtained.

Because of the particular shape of the driving member, the grating attachment may be cylindrically formed and may be divided into sections or zones having coarser or finer teeth and perforations, so that simultaneously with the same grating attachment, finer and coarser grating can be accomplished.

However, between the various zones or sections of the grating attachment, the latter is preferably provided on the outside with reinforcement rings, and sleeve-shaped members may be used for covering up one or more of the sections of the grating attachment which are not to be used.

In order to separate the grated mass portions from each other, I provide deflectors to downwardly deflect the grated mass.

For a detailed description of my new device, I refer to the annexed drawings, in which, by way of illustration, I have shown a few embodiments of my invention and in which—

Figure 2:
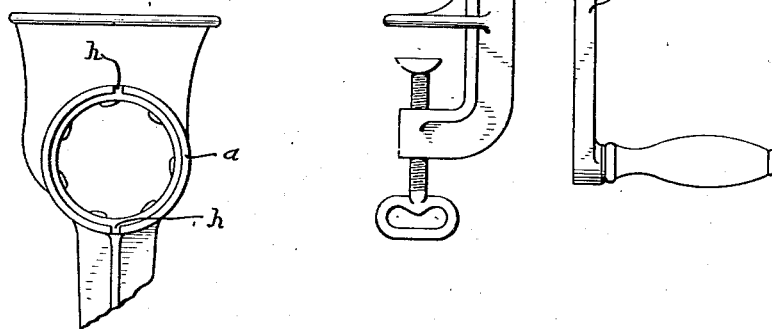
Figures 3, 4, 5:
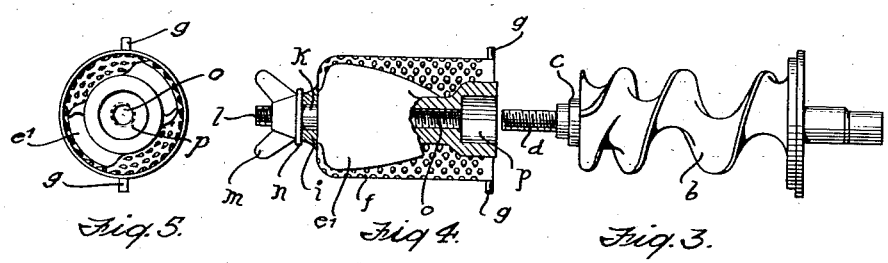

Fig. 1 is a sectional view of a meat-chopping machine having a grating device according to my invention attached to the open end of its tubular casing; Fig. 2 is a view of the machine viewed from the right in Fig. 1 with the operating crank broken off; Fig. 3 shows the helical cutter with its projecting threaded stem; Fig. 4 shows the grating device in section together with the driving member, the latter being partly broken away to show the threaded bore; Fig. 5 is a view of the grating device as seen from the right in Fig. 4; Fig. 6 is a sectional view of a large grating attachment provided with coarse, medium and fine teeth and enclosing a corresponding driving member; Fig. 7 is a sectional view of a modified grating attachment and driving member; Fig. 8 is a view seen from the right in Fig. 7; Fig. 9 is a similar view as Fig. 6, but showing a modified driving member.

At $a$ in Fig. 1 is shown the tubular casing of a meat-chopping machine. $b$ is the helical cutter enclosed in said casing and carrying at its end projecting from the front of the casing a crank for rotating the cutter. At the opposite end, the helical cutter, as shown in Fig. 3, is provided with a shoulder indicated at $c$ and a projecting threaded stem shown at $d$. At $e'$ is shown the driving member, which, as will appear from Fig. 4, is provided with a threaded bore $o$ to receive the projecting threaded stem $d$ of the helical cutter $b$. Moreover, the driving member $e'$ is formed in front of the threaded bore $o$ with a cavity $p$ to fit over the shoulder $c$ on the helical cutter $b$, so that when the driving member is screwed onto the threaded stem $d$, it will lie snugly against the end of the helical cutter and will be rotated therewith.

As shown in Figs. 1 and 4, the driving member $e'$ is enclosed by the grating attachment $f$, which is of cylindrical shape and at its inner end is provided with lugs $g$ adapted to engage corresponding notches $h$ provided in the end of the tubular casing $a$, as clearly appears from Fig. 2. In this manner, the grating attachment when in place is prevented from rotation relative to said tubular casing. At its outer end, the grating attachment is provided with a bearing shown at $i$ in Figs. 1 and 4 to receive the journal $k$ provided at the outer end of the driving member $e'$. Beyond the journal $k$, the driving member is provided with a threaded part $l$ to receive a wing-nut $m$ for securing the driving member in operative position. Between the wing-nut $m$ and the bearing $i$ is interposed a washer shown at $n$. To prevent rotation of the same relative to the threaded part $l$, the latter is flattened on one side, the hole in the washer to fit the threaded part being correspondingly shaped. It will thus be seen, that while the grating attachment $f$ by reason of its lungs $g$ engaging the notches $h$ in the end of the tubular casing $a$ is held in fixed position, rotation is imparted to the driving member $e'$ as the helical cutter $b$ is rotated in the tubular casing $a$ by means of the crank $c'$.

In the modification shown in Fig. 6, the elongated driving member $e^2$ is provided with two successive helically formed wing-portions, while the cylindrical grating attachment F enclosing said elongated driving member is subdivided along its length into zones $f^1$, $f^2$ and $f^3$, formed with coarse, medium and fine grating teeth and correspondingly shaped holes. At $q^1$, $q^2$ and $q^3$ in Fig. 6 are indicated deflecting members, in the shape of hoods, for the grated food-stuff.

A similar construction of the grating device is shown in Fig. 9, in which the grating attachment F' enclosing the driving member is likewise subdivided into zones or sections $f^1$, $f^2$ and $f^3$, similar to those shown in Fig. 6, that is to say, the various sections in the order named have coarse, medium and fine grating teeth and corresponding holes. The driving member shown at $e^4$ is in this embodiment formed with six relatively offset wing-portions alternately projecting from opposite sides of the central portion of the driving member in such a way, that two wing-portions always cooperate with the particular inner grating surface of one zone.

At $r$ in Fig. 9 is shown a tubular sleeve in frictional engagement with, and adapted to be moved by hand along, the outer surface of the grating attachment so that, as desired, one of the zones can be eliminated during the grating operation. In the embodiment shown in Fig. 9, the said tubular sleeve is shown to cover up the zone $f^3$ of the grating attachment so that no food-stuff will be delivered therefrom. As shown in Fig. 9, the circular edges of the tubular sleeve $r$ are curled over, as indicated at $r'$ to afford a grip for moving the sleeve along the peripheral surface of the grating attachment.

At $q^1$, $q^2$ and $q^3$ are shown the same kind of deflecting hoods shown in Fig. 6. In the latter figure are shown at $s$ reinforcement rings or hoops for the grating attachment arranged at the places of interval between the various zones.

The embodiment of the invention shown in Figs. 7 and 8 shows a driving member $e^3$ formed with two relatively offset wing-portions of similar shape as those shown in Fig. 9. The particular shape of these wing portions will best be seen from Fig. 8. The comminuted food-stuff to be grated is first engaged by the front wing portion and after having been forced thereby against the grating teeth provided on the inner surface of the grating attachment $f$, is moved along into engagement with the rear wing-portion, which in its turn forces the food-stuff against the grating teeth of the grating attachment.

While I have described and shown various embodiments of my invention, it is, of course, understood that I do not limit myself to these particular embodiments, as my invention is capable of other embodiments within the scope of the present invention.

I claim:

1. A food grating attachment for a food comminuting machine of the type comprising a casing and a food advancing screw rotatable therein, said attachment comprising a hollow, cylindrical grating member and a cooperating screw element for rotating and advancing food within said grating member, means for fastening said screw element to said screw as an end extension of the latter, means for fastening said grating member in fixed relationship to said casing as an end extension of the latter and in enclosing relationship to said screw element, said grating member being divided longitudinally into separate sections of substantially equal length each having grating teeth and food discharge holes of a size different from the teeth and holes of each other section, a plurality of grated food receiving compartments, one individual to each grating section, around said grating member, and a sleeve around and slidably engaging said grating member, said sleeve being of a length substantially corresponding to the length of one of said grating sections and being slidable along said grating member to cover the food discharge holes of any one of said grating sections.

2. A food grating machine comprising a hollow, cylindrical grating member, hopper means for the supply of food to said member adjacent to one end thereof, means within said grating member for rotating and longitudinally advancing food therein, said grating member being divided longitudinally into separate sections of substantially equal length each having grating teeth and food discharge holes of a size different from the teeth and holes of each other section, a plurality of grated food receiving compartments, one individual to each grating section, around said grating member, and a sleeve around and slidably engaging said grating member, said sleeve being of a length substantially corresponding to the length of one of said grating sections and being slidable along said grating member to cover the food discharge holes of any one of said grating sections.

GEBHARD SATZINGER.